(12) United States Patent
Cowley et al.

(10) Patent No.: US 11,426,684 B2
(45) Date of Patent: Aug. 30, 2022

(54) STRAINER FOR USE IN FLUID PIPING

(71) Applicant: Vexo International (UK) Limited, London (GB)

(72) Inventors: Richard Cowley, St Francis Bay (ZA); Darren Wilkinson, Henlow (GB)

(73) Assignee: Vexo International (UK) Limited, London (GB)

( * ) Notice: Subject to any disclaimer, the term of this patent is extended or adjusted under 35 U.S.C. 154(b) by 221 days.

(21) Appl. No.: 16/616,048

(22) PCT Filed: May 25, 2018

(86) PCT No.: PCT/GB2018/051429
§ 371 (c)(1),
(2) Date: Nov. 22, 2019

(87) PCT Pub. No.: WO2018/215788
PCT Pub. Date: Nov. 29, 2018

(65) Prior Publication Data
US 2020/0139275 A1 May 7, 2020

(30) Foreign Application Priority Data
May 25, 2017 (GB) ...................................... 1708380

(51) Int. Cl.
*B01D 35/06* (2006.01)
*B01D 29/35* (2006.01)
(Continued)

(52) U.S. Cl.
CPC ............. *B01D 35/06* (2013.01); *B01D 29/35* (2013.01); *B01D 35/02* (2013.01); *B01D 39/10* (2013.01);
(Continued)

(58) Field of Classification Search
CPC ....................................................... B01D 35/06
(Continued)

(56) References Cited

U.S. PATENT DOCUMENTS 2,603,353 A * 7/1952 Cooney ................. B01D 35/06
210/223
2,800,230 A * 7/1957 Thoma ..................... B03C 1/28
210/454
(Continued)

FOREIGN PATENT DOCUMENTS

CN 202061466 U 12/2011
CN 202315523 U 7/2012
(Continued)

OTHER PUBLICATIONS

English language machine translation of JP-2010279887-A, generated Sep. 8, 2021. (Year: 2021).*

*Primary Examiner* — David C Mellon
(74) *Attorney, Agent, or Firm* — Lightbulb IP, LLC

(57) ABSTRACT

A strainer (101) for use in fluid piping. The strainer (101) comprises a body (102) for connection to a fluid piping inflow conduit (201) and to a fluid piping outflow conduit (202). The body (102) defines an interior chamber (103), a fluid inlet port (104) and a fluid outlet port (105). The body (102) defines a fluid flow path (106) between the fluid inlet port (104) and the fluid outlet port (105) that extends through the interior chamber (103). The strainer (101) comprises a screen collector (107) that is removably locatable in the body (102), within the fluid flow path (106). The strainer (101) further comprises a permanent magnet collector (102)

(Continued)

that is removably locatable in the body (102). The strainer (101) may be used in fluid circuit piping of a heating or a cooling system.

16 Claims, 5 Drawing Sheets

(51) Int. Cl.
| | |
|---|---|
| *B01D 35/02* | (2006.01) |
| *B01D 39/10* | (2006.01) |
| *B03C 1/033* | (2006.01) |
| *B03C 1/28* | (2006.01) |
| *C02F 1/48* | (2006.01) |
| *F16L 55/24* | (2006.01) |
| *F24D 19/00* | (2006.01) |
| *C02F 1/00* | (2006.01) |
| *C02F 103/02* | (2006.01) |

(52) U.S. Cl.
CPC ............ *B03C 1/0332* (2013.01); *B03C 1/286* (2013.01); *C02F 1/001* (2013.01); *C02F 1/481* (2013.01); *F16L 55/24* (2013.01); *F24D 19/0092* (2013.01); *B03C 2201/18* (2013.01); *B03C 2201/28* (2013.01); *C02F 2103/023* (2013.01); *C02F 2303/24* (2013.01)

(58) Field of Classification Search
USPC ........................................................ 210/223
See application file for complete search history.

(56) References Cited

U.S. PATENT DOCUMENTS

| | | | | |
|---|---|---|---|---|
| 3,372,807 | A * | 3/1968 | Barnard | F01P 11/06 |
| | | | | 210/310 |
| 3,421,627 | A * | 1/1969 | Lammers | B01D 35/147 |
| | | | | 210/223 |
| 3,834,539 | A * | 9/1974 | Thompson | F28F 19/01 |
| | | | | 4/256.1 |
| 4,183,812 | A * | 1/1980 | Rosaen | B01D 35/02 |
| | | | | 210/447 |
| 5,089,129 | A * | 2/1992 | Brigman | B01D 35/06 |
| | | | | 210/223 |
| 2016/0206982 | A1* | 7/2016 | Richter | B01D 35/02 |
| 2016/0263503 | A1* | 9/2016 | Holbach | B01D 35/023 |
| 2016/0354790 | A1* | 12/2016 | Hassell | B01D 45/16 |
| 2017/0299107 | A1* | 10/2017 | Richter | B01D 35/02 |
| 2019/0314744 | A1* | 10/2019 | Richter | B01D 35/02 |
| 2020/0129990 | A1* | 4/2020 | Lee | B03C 1/0332 |
| 2020/0222832 | A1* | 7/2020 | Holbach | B03C 1/284 |

FOREIGN PATENT DOCUMENTS

| | | | |
|---|---|---|---|
| CN | 202605871 U | 12/2012 | |
| CN | 203878668 U | 10/2014 | |
| GB | 2503762 A | 1/2014 | |
| JP | H08117517 | 5/1996 | |
| JP | 2010279886 | 12/2010 | |
| JP | 2010279887 A * | 12/2010 | ............ B03C 1/286 |
| JP | 2014138912 A | 7/2014 | |

* cited by examiner

STRAINER FOR USE IN FLUID PIPING

FIELD OF THE INVENTION

The present invention relates to fluid treatment, in particular to a strainer for use in fluid piping, for example fluid circuit piping of a heating or cooling system.

BACKGROUND OF THE INVENTION

Known heating and cooling systems comprise a fluid circuit through which a fluid circulates under pressure. An example of this type of system is a closed circuit central heating system, in which system water flows in a loop from a boiler, through a series of radiators or heat emitters, and then back to the boiler.

Systems of this type are typically manufactured from steel and other common metals. In such systems, material surfaces are exposed to the circulated fluid. A problem that is commonly associated that these systems is the corrosion of metal that is in contact with the system fluid.

System corrosion results in contamination of the circulated water with corrosion particles, such as rust, detritus and other undesirable debris. The presence of corrosion particles within the circulated liquid negatively impacts system performance and causes damage. Unless the corrosion particles are captured and removed from the contaminated circulated liquid, system components can become clogged or blocked, leading to a significant loss of system efficiency, further system deterioration from leaks, and eventually total system failure.

When the performance efficiency of a heating or cooling system reduces due to the effects of corrosion contamination, both the amount of energy required to operate the system and the amount of carbon dioxide ($CO_2$) emitted by the system increases. It is therefore desirable from economic and environmental perspectives to prevent or inhibit the detrimental effect of corrosion particles within the circulating liquid.

A known device for use in removing corrosion particles from the circulating fluid is a strainer (also termed a pipeline strainer). The strainer is connected to the fluid circuit piping, directly in-line with the fluid flow, and functions to mechanically remove unwanted solids from the system fluid. When installed, fluid flows through a screen within the strainer, which acts as a physical filter. Particles in the system fluid that are over a certain size are trapped by the screen, and captured particles are retained within the strainer for subsequent removal.

Strainers are typically installed upstream of equipment to be protected. For example, a strainer may be installed upstream of a pump to prevent larger pieces of debris from fouling the impeller, which could result in a blockage or damage. By way of further example, a strainer may be used upstream of a boiler, a heat exchanger, or a large and/or expensive item in a system.

A first type of prior art strainer is known as a Y-type strainer. The body of a Y-type strainer has first and second branches providing an inlet and an outlet, and a third intermediate branch providing a pocket for a screen that intersects the fluid flow path between the inlet and outlet, such that fluid flowing through the body passes through the screen. The screen is typically cylindrical and made from a metal perforated sheet or mesh. In use, fluid flows into an open end of the cylindrical screen and any particles that are too big to flow through the openings, such as rust and detritus particles, are trapped inside for subsequent removal.

In this way, contaminant particles over a certain size are separated from the circulating fluid as it flows through the strainer. Over time, however, the particles captured within the cylindrical screen build up and inhibit throughflow. To prevent problems arising from clogging or blocking of the screen by caught particles, routine maintenance is required to remove the collected detritus from within the strainer. However, unlike some filters, the screen can be cleaned and reused.

A typical screen has openings dimensioned to prevent passage therethrough of particles having a particle size equal to or greater than 80 microns. Therefore, particles having a particle size less than 80 microns are not prevented from flowing through the strainer and back into circulation. It is known for these smaller particles to settle in 'low flow' areas, for example at the bottom of radiators and pipes of a heating system. Further, it is known for rust particles, which are relatively very small, to combine with scale deposits to form a sludge-like substance (generally termed sludge). This is particularly prevalent in areas of particle settlement. Sludge is a common problem within heating systems, and can block pipework and develop into large clumps in the bottom of radiators. Sludge deposits or clumps at the lower end of a radiator cause a localised reduction in heat transmission (known in the industry as a cold spot). The presence of such cold spots increases energy usage and places the system under operational strain.

SUMMARY OF THE INVENTION

According to a first aspect there is provided a strainer for use in fluid piping, said strainer comprising: a body for connection to a fluid piping inflow conduit and to a fluid piping outflow conduit, the body defining an interior chamber, a fluid inlet port and a fluid outlet port, and the body defining a fluid flow path between the fluid inlet port and the fluid outlet port that extends through the interior chamber, and a screen collector removably locatable in the body, within the fluid flow path; wherein the strainer further comprises a permanent magnet collector removably locatable in the body.

The screen collector may comprise a substantially tubular body having an open fluid inflow end, the substantially tubular body locatable within the fluid flow path such that fluid flowing from the fluid inlet port towards the fluid outlet port enters the substantially tubular body through the open fluid inflow end.

The permanent magnet collector may be removably positionable within the substantially tubular body of the screen collector.

The screen collector may define a plurality of openings dimensioned to capture particles having a particle size equal to or greater than 80 microns.

The strainer may comprise a permanent magnet collector housing made from a non-magnetic material in which the permanent magnet collector is located. The permanent magnet collector may be removably located within the permanent magnet collector housing.

The body may define a collector port open to the interior chamber through which the screen collector and the permanent magnet collector may be removably inserted into the body. The body may have a Y-shape, and in which a first branch of the Y-shape comprises the fluid inlet port, a second branch of the Y-shape comprises the fluid outlet port and a third branch of the Y-shape comprises the collector port.

A collector port cap assembly may be provided, the collector port cap assembly comprising: a first cap releasably engageable with the body to selectively seal the collector port, the first cap made from a non-magnetic material and defining a permanent magnet collector housing chamber into which the permanent magnet collector is removably locatable; and a second cap releasably engageable with the first cap to selectively seal the permanent magnet collector housing chamber, the second cap made from a non-magnetic material. The permanent magnet collector may be releasably securable to the second cap. A fixing element may be provided for releasably securing the permanent magnet collector to the second cap.

The second cap may extend into the permanent magnet collector housing chamber of the first cap when the second cap is engaged with the first cap.

The permanent magnet may have a first end, a second end and a side wall extending between the first end and the second end, and the permanent magnet may be removably locatable within the permanent magnet collector housing chamber such that that the first end and the second end are positioned within the interior chamber of the body.

The body may be provided with first and second connection screw threads, or with first and second connection flanges, for use in connecting the body to a fluid piping inflow conduit and to a fluid piping outflow conduit.

According to a second aspect, a strainer according to the first aspect is used in fluid circuit piping of a heating or cooling system.

According to a third aspect there is provided fluid piping provided with a strainer according to the first aspect.

According to a fourth aspect there is provided a method of installing fluid treatment apparatus in fluid piping, the method comprising the steps of: receiving a strainer according to the first aspect; locating the screen collector within the body of the strainer; locating the permanent magnet collector within the body of the strainer; connecting the body of the strainer to a fluid piping inflow conduit of the fluid piping; connecting the body of the strainer to a fluid piping outflow conduit of the fluid piping.

In an application, the fluid piping is fluid circuit piping of a heating or cooling system.

According to a fourth aspect there is provided a method of treating fluid of fluid piping, the method comprising the steps of: identifying a strainer according to the first aspect that is installed within fluid piping following a method according to the fourth aspect; isolating the strainer from fluid flow; removing, cleaning and replacing the screen collector; removing, cleaning and replacing the permanent magnet collector; and restarting a fluid flow into the body.

The invention advantageously provides a pipe line strainer with both a mechanical and a magnetic collector.

Further particular and preferred aspects of the invention are set out in the accompanying dependent claims.

BRIEF DESCRIPTION OF THE DRAWINGS

The present invention will now be more particularly described, with reference to the accompanying drawings, in which.

DESCRIPTION

Example embodiments are described below in sufficient detail to enable those of ordinary skill in the art to embody and implement the apparatus, systems and processes described herein. It is to be understood that embodiments can be provided in many alternate forms and the invention should not be construed as limited to the examples set forth herein but by the scope of the appended claims.

A strainer 101 is shown in FIGS. 1 to 4. The strainer 101 is suitable for use in fluid piping, for example fluid circuit piping of a heating or cooling system.

Figure 1:
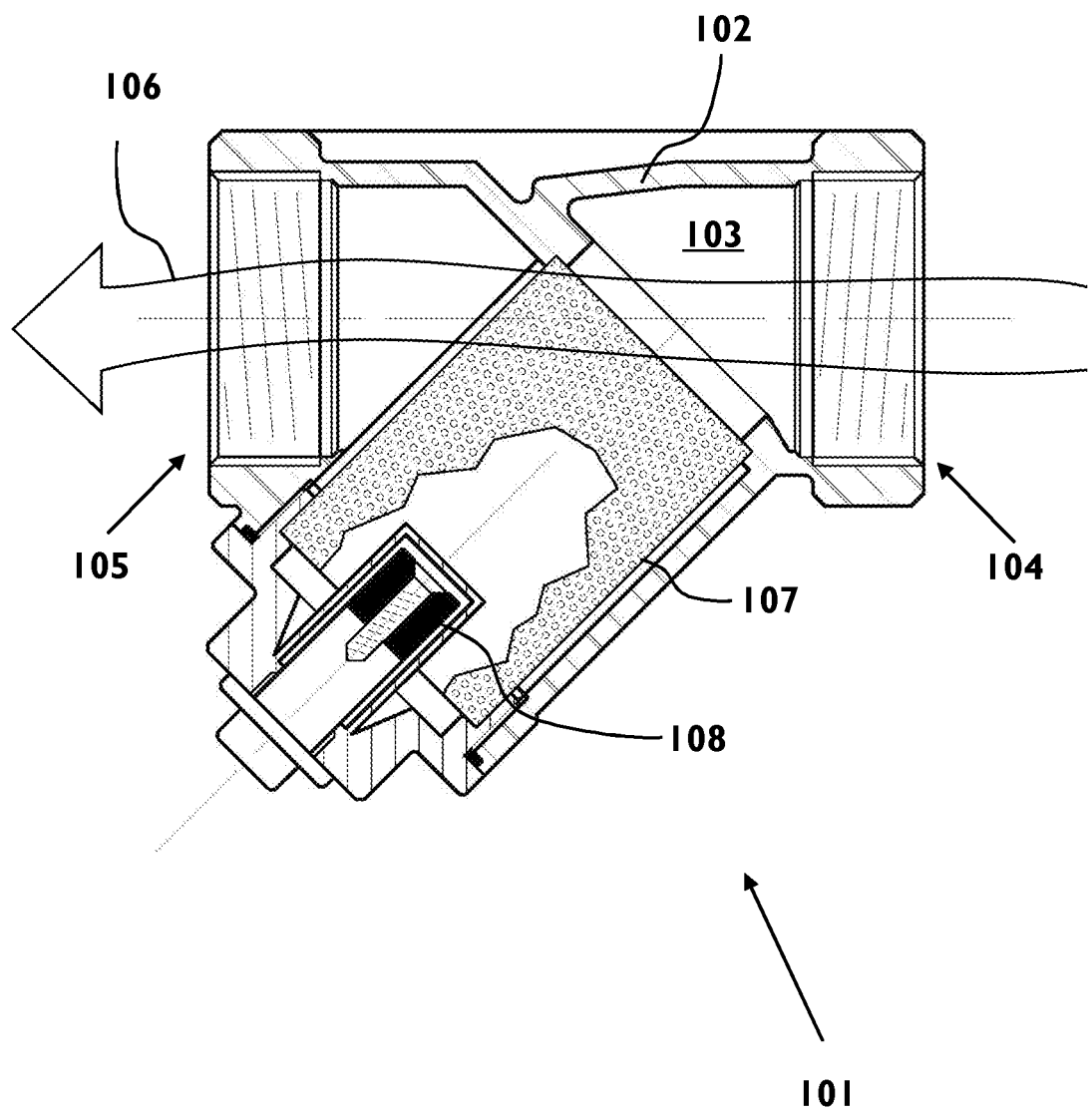
FIG. 1 shows a strainer for use in fluid piping, in a fully assembled condition.
Figure 2:
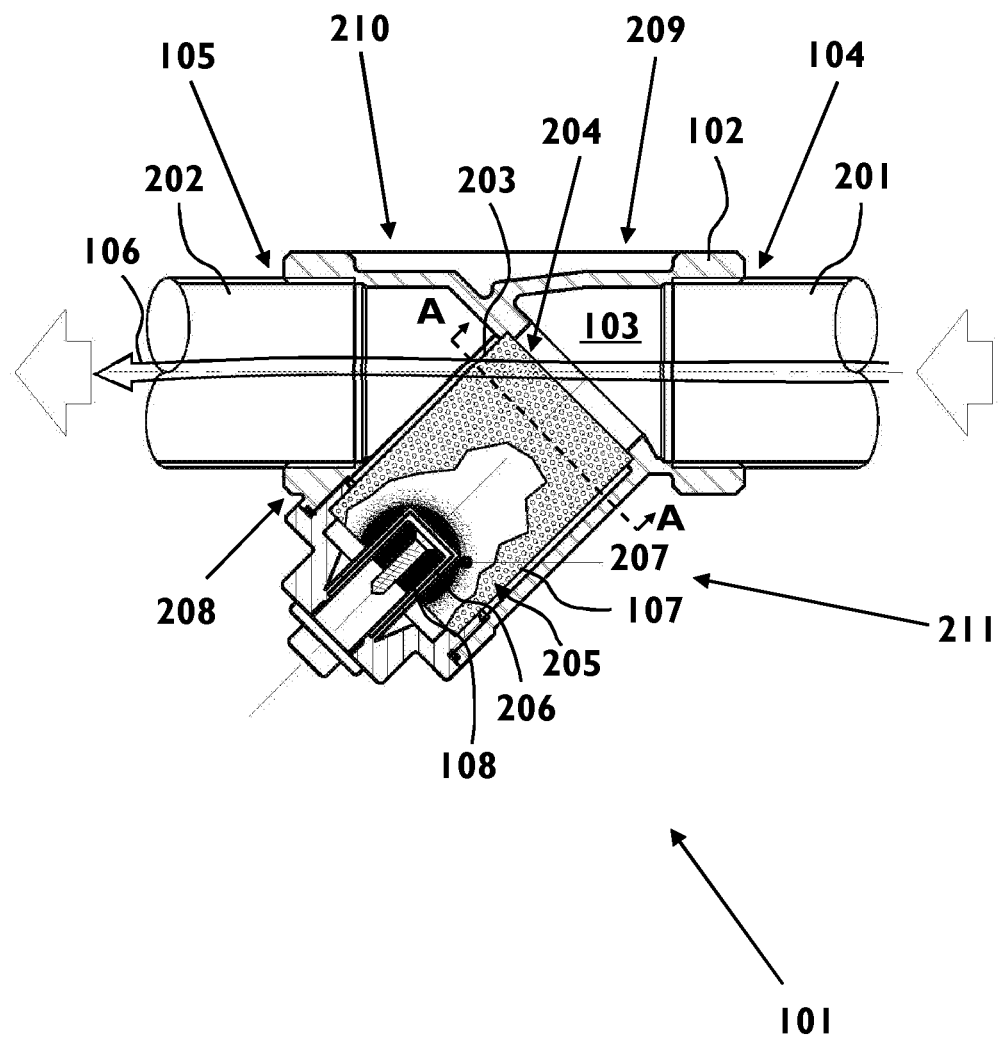
FIG. 2 shows the strainer of FIG. 1 installed in fluid piping.

In FIGS. 1 and 2, the strainer 101 is shown in a fully assembled condition.

Referring to FIG. 1, strainer 101 comprises a body 102 for connection to connection to a fluid piping inflow conduit and to a fluid piping outflow conduit, as will be described in further detail below with reference to FIG. 2.

The body 102 defines an interior chamber 103, a fluid inlet port 104 and a fluid outlet port 105. The body 102 defines a fluid flow path, indicated by arrow 106, between the fluid inlet port 104 and the fluid outlet port 105 that extends through the interior chamber 103. The body 102 is arranged such that fluid, such as circulating liquid of a heating or cooling system, flowing therethrough from the fluid inlet port 104 to the fluid outlet port 105 passes through the interior chamber 103.

The strainer 101 comprises a screen collector 107. The screen collector 107 allows fluid to flow therethrough. The screen collector 107 is removably locatable in the body 102. More specifically, and as shown in FIGS. 1 and 2, the screen collector 107 is locatable in the interior chamber 103, within the fluid flow path 106. The screen collector 107 is locatable within the body 102 such that fluid flowing through the strainer 101 from the fluid inlet port 104 to the fluid outlet port 105 passes through the screen collector 107. The screen collector 107 is described in detail below.

The strainer 101 further comprises a permanent magnet collector 108. The permanent magnet collector 108 is removably locatable in the body 102. As shown in FIGS. 1 and 2, the permanent magnet collector 108 is positionable to collect magnetic particles from fluid flowing through the interior chamber 103. The permanent magnet collector 108 is described in detail below.

The strainer 101 is arranged to mechanically capture particles having a particle size equal or greater than a predetermined size and to magnetically capture magnetic particles having a particle size less than the predetermined size. In an example, the predetermined size is 80 microns and particles having a particle size equal or greater than 80 microns are captured by the screen collector 107 and particles having a particle size less than 80 microns are captured by the permanent magnet collector 108. It is to be appreciated that the predetermined size may vary between applications.

Thus, the screen collector 107 is not limited to screening particles that are 80 microns or greater in size. The screen collector 107 can be selected to screen particles of a different particle size, for example depending on the particular intended application of the strainer 101.

The permanent magnet collector thus provides an additional straining effect to that provided by the screen collector.

Strainer 101 is shown installed for use in FIG. 2. As illustrated, the body 102 is connected to a fluid piping inflow conduit 201 and to a fluid piping outflow conduit 202. Fluid flowing from the fluid piping inflow conduit 201 to the fluid piping outflow conduit 202 flows through the interior chamber 103 of the body 102.

The body 102 is made from a non-magnetic material. In an example, the body 102 is made from a non-magnetic metal, for example stainless steel or brass. The body 102 may however be made from any suitable non-magnetic material or combination of non-magnetic materials.

According to the specific illustrated embodiment, the screen collector 107 comprises a substantially tubular body 203 having an open fluid inflow end 204. The screen collector 107 may take the form of a basket. As shown, the substantially tubular body 203 is locatable within the fluid flow path 106 such that fluid flowing from the fluid inlet port 104 towards the fluid outlet port 105 enters the substantially tubular body 203 through the open fluid inflow end 204.

In this example, the substantially tubular body 203 is substantially cylindrical. The substantially tubular body 203 has a substantially circular shaped cross section, in the direction A-A. It is to be appreciated that in alternative examples the substantially tubular body 203 may have any suitable alternative cross-sectional shape.

In this example, the screen collector 107 defines a plurality of openings 205 dimensioned to capture particles having a particle size equal to or greater than 80 microns. The screen collector 107 may however be arranged to capture particles of any suitable alternative size. The screen collector 107 is arranged to separate particles of a certain size from fluid flowing through the strainer 101.

In this example, the screen collector 107 comprises a perforated metal sheet screen. It is to be appreciated that the screen collector could comprise any suitable alternative type of screen, for example an expanded metal sheet screen, a welded wire mesh screen, or a woven wire mesh screen. Further, the screen may be made from any suitable material or combination of materials, and is not limited to being made from metal.

The screen collector 107 may define any suitable number of openings 205, which may be any suitable size and shape and which may include openings of different sizes and/or shapes.

In this example, the permanent magnet collector 108 comprises a rare-earth magnet. The permanent magnet collector 108 may comprise an alternative type of magnet, for example a ferrite or AlNiCo type magnet. The permanent magnet collector 108 may comprise one or more magnets. The permanent magnet collector 108 is arranged to separate magnetic particles from fluid flowing through the strainer 101.

During use of the strainer 101, circulating fluid flowing in the fluid piping flows from the fluid piping inflow conduit 201, through the fluid inlet port 104 into the interior chamber 103, through the screen collector 107 and through the fluid outlet port 105 to exit the interior chamber 103 into the fluid piping outflow conduit 202.

As the fluid flows through the strainer 101, particles in the fluid are captured in the interior chamber 103.

Particles having a particle size that is equal to or greater than a predetermined particle size are collected by the screen collector 107. Magnetic particles having a particle size less than the predetermined particle size are collected by the permanent magnet collector 108. It is to be appreciated however that the permanent magnet collector 108 may also collect particles having a particle size that is equal to or greater than the predetermined particle size, as will know be described.

As shown, in the illustrated embodiment, the substantially tubular body 203 is locatable within the fluid flow path 106 such that fluid flowing from the fluid inlet port 104 towards the fluid outlet port 105 enters the substantially tubular body 203 through the open fluid inflow end 204. It can be seen that the substantially tubular body 203 and the body 102, in particular the internal profile of the body 102, are arranged such that all the fluid entering the strainer 101 must enter the substantially tubular body 203 of the screen collector 107. Any particles in the fluid that are too big to pass through the openings 205 are mechanically captured and retained within the substantially tubular body 203 of the screen collector 107.

In this illustrated embodiment, the permanent magnet collector 108 is removably positionable within the substantially tubular body 203 of the screen collector 107. With this arrangement, magnetic particles attracted to the permanent magnet collector 108 are retained within the substantially tubular body 203 of the screen collector 107, along with the particles mechanically captured by the screen collector 107. It is to be appreciated that any suitable alternative relative positioning of the permanent magnet collector 108 and the screen collector 107 may be utilised.

The screen collector 107 and permanent magnet collector 108 function to remove particles, such as corrosion particles, from contaminated fluid flowing through the strainer 101, such that fluid exits the interior chamber 103 cleaner than when it entered the interior chamber 103. Thus, using the strainer 101 upstream of an item of equipment functions to prevent contaminant particles from flowing to that item of equipment.

In this embodiment, the strainer 101 further comprises a permanent magnet collector housing 206 made from a non-magnetic material in which the permanent magnet collector 108 is located. Preferably, and in this example, the permanent magnet collector 108 is removably located in the permanent magnet collector housing 206. The permanent magnet collector housing 206 advantageously maintains the permanent magnet collector 108 in a dry condition. The permanent magnet collector housing 206 beneficially protects the permanent magnet collector 108 from detrimental effects of exposure to system fluid flowing through the interior chamber 103. The permanent magnet collector housing may be made from any suitable non-magnetic material or combination of non-magnetic materials.

In FIG. 2, particles 207 are shown collected around the permanent magnet collector housing 206 due to a magnetic attraction between the particles 207 and the permanent magnet collector 108 located within the permanent magnet collector housing 206.

In this illustrated embodiment, the body 102 defines a collector port 208 open to the interior chamber 103 through which the screen collector 107 and the permanent magnet collector 108 can be removably inserted into the body 102.

According to the present embodiment, the body 102 has a Y-shape. A first branch 209 of the Y-shape comprises the fluid inlet port 104, a second branch 210 of the Y-shape comprises the fluid outlet port 105 and a third branch 211 of the Y-shape comprises the collector port 208. In this illustrated example, the fluid inlet port 104 and the fluid outlet port 105 are aligned, with the first and second branches 209, 210 of the Y-shape being arranged linearly, and the third branch 211 extends outwardly from a position intermediate the fluid inlet and outlet ports 104, 105.

In the shown arrangement, the body 102 comprises an internal annular shoulder 211 against which the substantially tubular body 203 of the screen collector 107 abuts.

When the screen collector 107 is located within the body 102 as shown, the interior chamber 103 is, in effect, divided into three zones—a first zone upstream of the screen collector 107, a second zone occupied by the substantially tubular body 203 of the screen collector 107 and a third zone downstream of the screen collector 107.

In FIG. 2, the strainer 101 is shown installed between the fluid piping inflow and outflow conduits 201, 202 such that the first and second branches 209, 210 of the Y-shaped body 102 are in a generally orientation along a virtual horizontal line and the third branch 211 of the Y-shaped body 102 points downwardly from the virtual horizontal line. With this orientation, gravity assists with the retention of collected particles within the substantially tubular body 203 of the screen collector 107.

Figure 3:
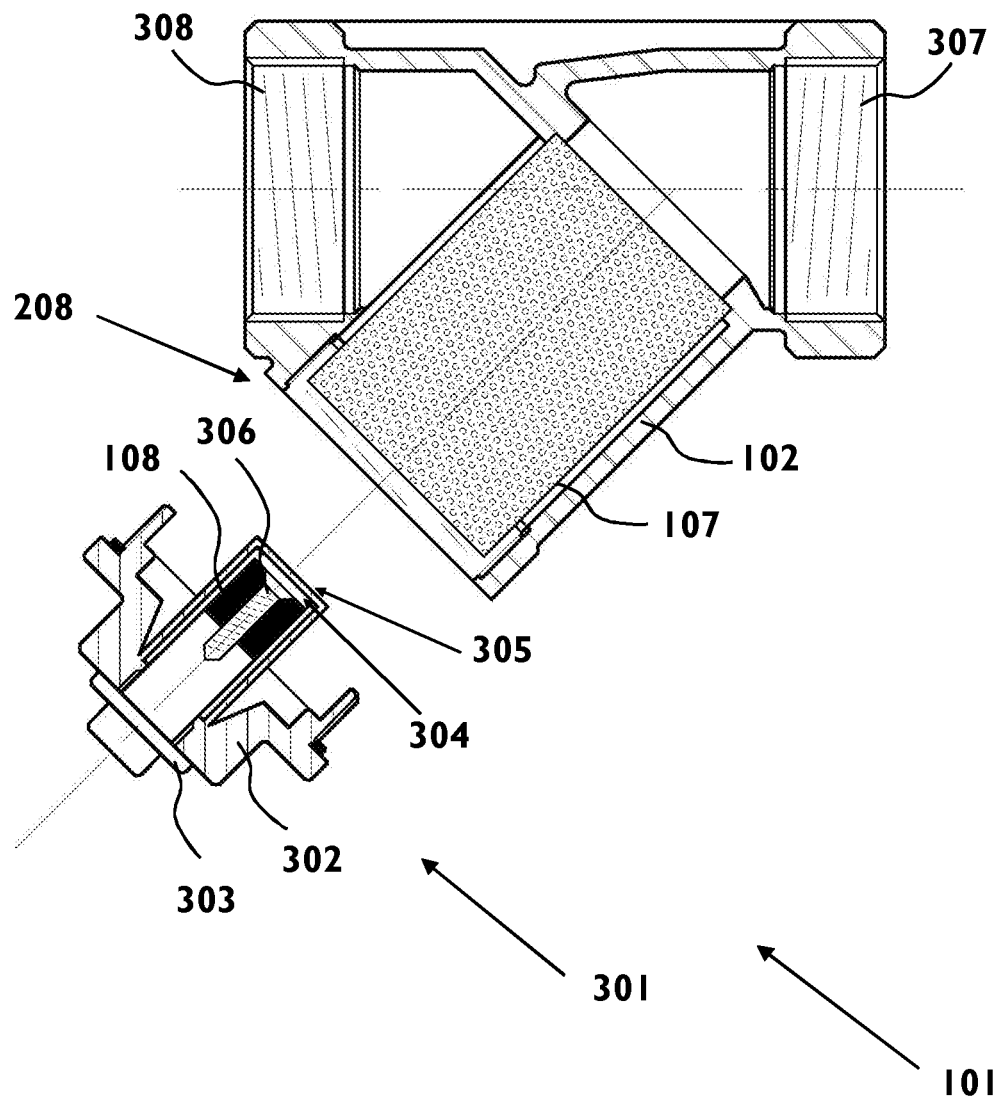
FIG. 3 shows the strainer of FIG. 1, in a partially assembled condition.
Figure 4:
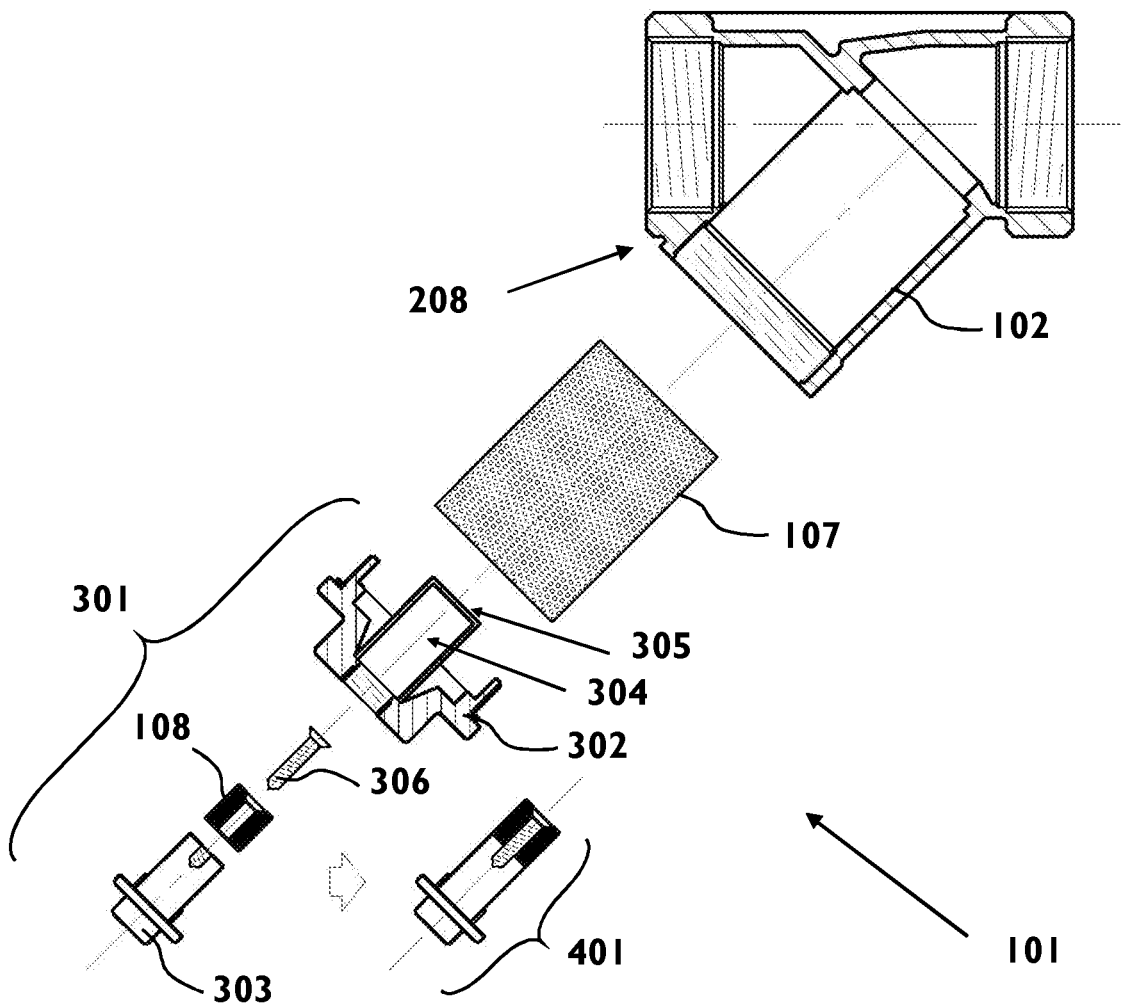
FIG. 4 shows the strainer of FIG. 1, in a fully disassembled condition.

Further features of the present embodiment will now be described with reference to FIGS. 3 and 4.

The strainer 101 comprises a collector port cap assembly 301. In this illustrated example, the collector port cap assembly 301 comprises a first cap 302 and a second cap 303. The first cap 302 is releasably engageable with the body 102 to selectively seal the collector port 208. The first cap 302 is made from a non-magnetic material and comprises a permanent magnet collector housing chamber 304 into which the permanent magnet collector 108 is removably locatable. The second cap 303 is releasably engageable with the first cap 302 to selectively seal the permanent magnet collector housing chamber 206 and is made from a non-magnetic material.

The first cap 302 may be releasably engageable with the body 102 by any suitable engagement arrangement, for example a co-operating screw thread arrangement or a snap-fit arrangement. The second cap 303 may be releasably engageable with the first cap 302 by any suitable engagement arrangement, for example a co-operating screw thread arrangement or a snap-fit arrangement.

The first cap 302 and the second cap 303 may each be made from any suitable non-magnetic material or combination of non-magnetic materials. Each of the first cap 302 and the second cap 303 may be made from a plastics material. The first cap 302 and the second cap 303 may be made from the same, or different, plastics material.

In the illustrated example, the permanent magnet collector housing chamber 304 is positioned centrally of the first cap 302. The permanent magnet collector housing chamber 304 may be positioned at any suitable alternative site. As shown, the permanent magnet collector housing chamber 304 has an external surface 305.

In this illustrated example, a fixing element 306 for releasably securing the permanent magnet collector 108 to the second cap 303 is provided. In this example, the fixing element 306 is a screw. Any suitable alternative fixing element, elements or arrangement may be utilised.

The second cap 303 with permanent magnet collector 108 secured thereto forms a cap and magnet assembly 401. The cap and magnet assembly 402 is removable from the first cap 302. According to the shown example, the first cap 302 can be disengaged from the second cap 303 and then moved away from the second cap 303 to withdraw the permanent magnet collector 108 from the permanent magnet collector housing chamber 304 of the first cap 302. The cap and magnet assembly 402 can beneficially be detached from the first cap 302 while the first cap 302 is secured to the body 102 of the strainer 101. With the permanent magnet collector housing chamber 304 being integral to the first cap 302, which, in use, seals the collector port 208 of the body 102, the permanent magnet collector 108 can thus be withdrawn from the body 102 without unsealing the collector port 208.

Figure 5:
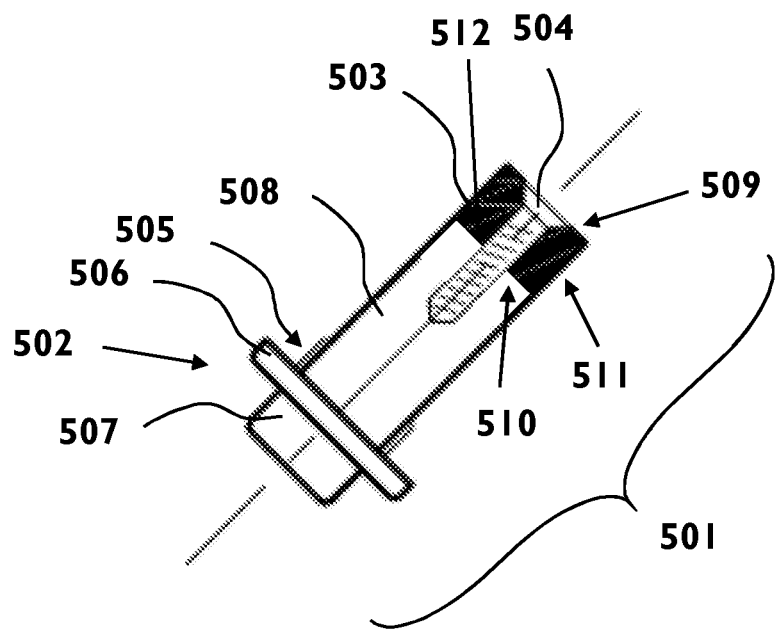
FIG. 5 shows a cap and magnet assembly.
Figure 6:
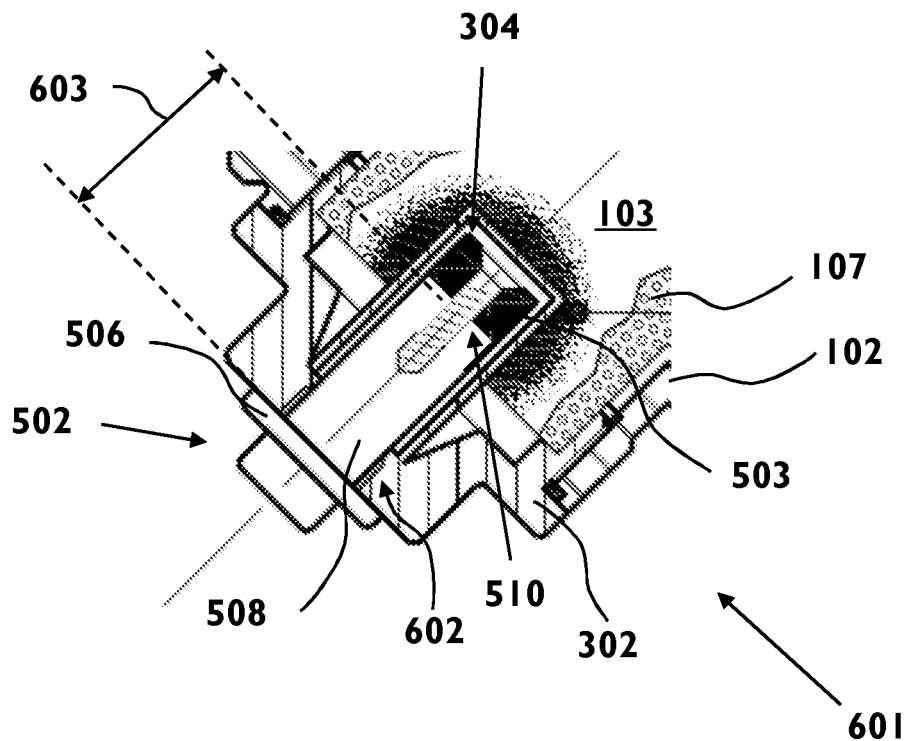
FIG. 6 shows the cap and magnet assembly of FIG. 5 arranged for use.

FIG. 5 shows a cap and magnet assembly 501. A strainer 601 is shown in FIG. 6. Strainer 601 of FIG. 6 is similar to strainer 101 of FIG. 1 but comprises the cap and magnet assembly 501 of FIG. 5 instead of the cap and magnet assembly 401 of FIG. 4. The cap and magnet assembly 501 of FIG. 5 is similar to the cap and magnet assembly 401 of FIG. 4 and will now be described with reference to FIG. 5 and FIG. 6.

Cap and magnet assembly 501 comprises a second cap 502 and a permanent magnet collector 503. The first cap 502 is made from non-magnetic material. In this example, the permanent magnet collector 503 is releasably securable to the second cap 502. In this example, the cap and magnet assembly 501 comprises a reusable fixing 504 for releasably securing the permanent magnet collector 503 to the second cap 502. The second cap 502 comprises an engagement portion for use in releasably engaging the second cap 502 with the first cap 302 of the strainer 601. According to the present example, the second cap 502 comprises an external screw thread 505 for co-operating with an internal screw thread 602 of the first cap 302. The second cap 502 comprises a collar 506. When the second cap 502 of the cap and magnet assembly 501 is engaged with the first cap 302, as shown in FIG. 6, the collar 506 is positioned up towards the exterior of the first cap 302.

As illustrated, the second cap 502 comprises an internal extension portion 508, which extends to the side of the collar 506 that is presented to the first cap 302 when the second cap 502 is being engaged therewith. The internal extension portion 508 is dimensioned to extend into the permanent magnet collector housing chamber 304 of the first cap 302 when the second cap 502 is secured therewith. Thus, the second cap 502 extends into the permanent magnet collector housing chamber 304 when engaged with the first cap 302.

Permanent magnet collector 503 has a first end 509, a second end 510, and a side wall 511 extending between the first and second ends 509, 510. In the present example, and as can be seen in FIG. 6, the permanent magnet collector 503 is removably locatable within the permanent magnet collector housing chamber 304 such that both the first end 509 and the second end 510 are positioned within the interior chamber 103 of the body 102. As a result, the magnetic field present all around the permanent magnet collector 503 is exerted within the interior chamber 103. More specifically, with the illustrated arrangement of strainer 601, the magnetic field applied by the permanent magnet collector 503 within the screen collector 107 is optimised. In addition, the size of the permanent magnet collector 108 can be effectively minimised.

In the shown example, the permanent magnet collector 503 is detachably attachable to free end 512 of the internal extension portion 508 of the second cap 502. When the cap and magnet assembly 501 is received within the first cap 302, the permanent magnet collector 503 is displaced from the underside of the collar 506 of the second cap 502 a distance 603 by the non-magnetic internal extension portion 508. The internal extension portion 508 ensures that the permanent magnet collector 503 is inserted to the desired position within the permanent magnet collector housing chamber 304 when the second cap 502 is engaged with the first cap 302. The use of the internal extension portion 508 ensures that magnetic material is not utilised within the strainer 601 at a position in which the effect of the associated magnetic field on magnetic particles within fluid flowing the internal chamber 103 thereof is relatively insignificant.

In this example also, the second cap 502 further comprises an external extension portion 509, which extends to the opposite side of the collar 506 and that remains outside of the first cap 302 when the second cap 502 is engaged therewith. In this specific example, the external extension portion 509 is profiled to allow a tool to be used thereon to facilitate engagement of the second cap 502 with the first cap 302. The external extension portion 509 may be profiled as a hexagonal head, with which a suitable socket can be used to effect rotation of the second cap 502.

The strainer 101 may be provided with any suitable arrangement for use in connecting the body 102 to a fluid piping inflow conduit and to a fluid piping outflow conduit. In this illustrated example, the body 102 is provided with first and second connection screw threads 307, 308 for use in connecting the body 102 to a fluid piping inflow conduit and to a fluid piping outflow conduit. In an alternative example, the body 102 is provided with first and second connection flanges for use in connecting the body 102 to a fluid piping inflow conduit and to a fluid piping outflow conduit It is to be appreciated that a strainer as described herein may have an alternative arrangement to that illustrated. For example, the body may define a collector port that is selectively sealable with a cap that does not form or comprise a permanent magnet collector housing chamber, in which case a separate permanent magnet collector housing may be provided.

Fluid piping may be provided with one or more of strainers as described herein. For example, strainers as described herein are usable in fluid circuit piping of a heating or cooling system, to protect one or more items of equipment, such as a pump, from contaminant particles in the circulating system water.

A method of installing fluid treatment apparatus in fluid piping will now be described. The method involves the steps of receiving strainer 101, connecting the body 102 of the strainer 101 to a fluid piping inflow conduit of the fluid piping and connecting the body 102 of the strainer 101 to a fluid piping outflow conduit of the fluid piping. The method also involves the steps of locating the screen collector 107 within the body 102 of the strainer 101 and locating the permanent magnet collector 108 within the body of the strainer 101. It is to be appreciated that as the screen collector 107 and permanent magnet collector 108 are removably locatable within the body 102 of the strainer 101, the above-mentioned steps may be performed in any suitable order. For example, the screen collector 107 and permanent magnet collector 108 may be located within the body 102 of the strainer 101 before or after the body 102 of the strainer 101 is connected between fluid piping inflow and outflow conduits.

In an application, the fluid piping is fluid circuit piping of a heating or cooling system. In such an application, the strainer is usable to remove contaminants, such as corrosion particles, from the circulating system liquid. In an alternative application, the fluid piping is piping of a fuel line. In such an application, the strainer is usable to remove contaminants from a flow of fuel. The fuel may, for example, be petrol.

A method of treating fluid of fluid piping will now be described. The method involves the steps of identifying a strainer 101 that is installed within fluid piping following the method of installing fluid treatment apparatus in fluid piping described above, stopping fluid flow into the body 102, removing, cleaning and replacing the screen collector 107, removing, cleaning and replacing the permanent magnet collector 108, and restarting a fluid flow into the body 102. The method of treatment provided by the strainer 101 is that of particle capturing and regular cleaning of the screen and permanent magnet collectors 107,108 ensures operational efficiency of the strainer 101 in capturing particles from the fluid flow and improves operational efficiency of the system.

Routine maintenance of the strainer 101 will now be described.

During normal operation of the strainer 101, particles having a particle size equal to or greater than a predetermined size that enter into the strainer 101 with the circulating fluid are captured by the screen collector 107. These mechanically captured particles are retained in the interior chamber 103 until subsequently removed. Further, during normal operation of the strainer 101, magnetic particles are attracted by the permanent magnet collector 108 and collect on the external surface 305 of the permanent magnet collector housing chamber 304 that is exposed to the circulating fluid (wet side of first cap 302). These magnetically captured particles are retained in the interior chamber 103 until subsequently removed.

To remove material collected from the circulating fluid by the strainer 101, the strainer 101 is isolated from fluid flow. Thus, the circulation of the system fluid into the strainer 101 is stopped. The first cap 302 is then removed from the body 102. Any magnetic detritus collected will be present on the external surface 305 of the permanent magnet collector housing chamber 304. The second cap 303 is then removed from the first cap 302, which has the effect of withdrawing the permanent magnet collector 108 from the permanent magnetic collector housing chamber 304. This removes the magnetic field previously applied by permanent magnet collector 108 to hold the collected magnetic particles on the external surface 305 of the permanent magnetic collector housing chamber 304. With the magnetic field now absent, the collected magnetic particles fall away from the first cap 302. The first cap 302 can be rinsed to ensure proper cleanliness, and the second cap 303 can then be replaced to seal the permanent magnet collector 108 within the permanent magnetic collector housing chamber 304. With the first cap 302 removed from the body 102, the screen collector 107 can be withdrawn through the collector port 208 and rinsed clean. The cleaned screen collector 107 can then be replaced in the interior chamber 103. Following cleaning of the screen collector 107 and the permanent magnet collector 108, the collector port cap assembly 301 can be reconnected to the body 102 to seal the collector port 208. The strainer 101 may then be opened back to the system flow. It is to be appreciated that the screen and permanent magnet collectors 107, 108 may be cleaned in any chronological order.

It is further to be appreciated that the screen and permanent magnet collectors 107, 108 of the strainer 101 may be substituted, for example to change the size of the openings of the screen collector or the magnetic field applied by the permanent magnet collector.

At least the following benefits are associated with the strainer of the present invention:

Magnetic particles are captured in addition to particles equal to greater than a particular size, which cleans the system flow more quickly The capturing of magnetic particles that smaller in size than the particles captured mechanically reduces the quantity of unwanted particles in the system flow, which provides cleaner system flow The capturing of smaller particles reduces the number of particles dropping out of suspension within the system flow into low flow areas, which prevents detritus build up and clumping and, in the application of a heating system, reduces the risk of sludge and cold spots The capturing of more particles from the system water improves the operational efficiency of the system (helps achieve the original design efficiency) and reduces the risk of component damage and system failure, which reduces energy and maintenance costs and reduces carbon dioxide ($CO_2$) emissions The strainer of the present invention is thus environmentally advantageous.

A strainer as described herein may have any suitable dimensions, any suitable appearance, may be made from any suitable materials or combination of materials and may be made using any suitable method, process or technique or any suitable combination of methods, processes or techniques. It is thus to be understood that any suitable material fabrication, construction and method of manufacture may be used. A strainer as described herein may be used in any suitable application.

Although illustrative embodiments of the invention have been disclosed in detail herein, with reference to the accompanying drawings, it is to be understood that the invention is not limited to the precise embodiments shown and that various changes and modifications can be effected therein by one skilled in the art without departing from the scope of the invention as defined by the appended claims.

The invention claimed is:

1. A strainer for use in fluid piping, said strainer comprising:

a body for connection to a fluid piping inflow conduit and to a fluid piping outflow conduit, the body defining an interior chamber, a fluid inlet port and a fluid outlet port, and the body defining a fluid flow path between the fluid inlet port and the fluid outlet port that extends through the interior chamber; and a screen collector removably locatable in the body, within the fluid flow path;

the strainer further comprising a permanent magnet collector removably locatable in the body; and said body defining a collector port open to the interior chamber through which the screen collector and the permanent magnet collector can be removably inserted into the body; wherein said strainer further comprises a collector port cap assembly comprising:

a first cap releasably engageable with the body to selectively seal the collector port, the first cap made from a non-magnetic material and defining a permanent magnet collector housing chamber into which the permanent magnet collector is removably locatable, and a second cap releasably engageable with the first cap to selectively seal the permanent magnet collector housing chamber, the second cap made from a non-magnetic material; and wherein said permanent magnet collector is releasably securable to said second cap to form a cap and magnet assembly, and the first cap is configured to be disengaged from the second cap and then moved away from the second cap to withdraw the permanent magnet collector from the permanent magnet collector housing chamber of the first cap.

2. A strainer as claimed in claim 1, further comprising a fixing element for releasably securing the permanent magnet collector to the second cap.

3. A strainer as claimed in claim 1, wherein said second cap extends into said permanent magnet collector housing chamber when engaged with said first cap.

4. A strainer as claimed in claim 1, wherein said permanent magnet collector has a first end, a second end, and a side wall extending between said first end and said second end, and said permanent magnet collector is removably locatable within said permanent magnet collector housing chamber such that that said first end and said second end are positioned within the interior chamber of the body.

5. A strainer as claimed in claim 1, wherein said screen collector comprises a substantially tubular body having an open fluid inflow end, the substantially tubular body locatable within the fluid flow path such that fluid flowing from the fluid inlet port towards the fluid outlet port enters the substantially tubular body through the open fluid inflow end.

6. A strainer as claimed in claim 5, wherein said substantially tubular body is substantially cylindrical.

7. A strainer as claimed in claim 6, wherein said permanent magnet collector is removably positionable within the substantially tubular body of the screen collector.

8. A strainer as claimed in claim 1, wherein said screen collector defines a plurality of openings dimensioned to capture particles having a particle size equal to or greater than 80 microns.

9. A strainer as claimed in claim 1, wherein the body has a Y-shape, and in which a first branch of the Y-shape comprises the fluid inlet port, a second branch of the Y-shape comprises the fluid outlet port and a third branch of the Y-shape comprises the collector port.

10. A strainer as claimed in claim 1, wherein said permanent magnet collector comprises a rare-earth magnet.

11. A strainer as claimed in claim 1, wherein said screen collector comprises a perforated metal sheet screen.

12. A strainer as claimed in claim 1, wherein said body is provided with one of the following for use in connecting the body to a fluid piping inflow conduit and to a fluid piping outflow conduit: first and second connection screw threads, first and second connection flanges.

13. Fluid piping provided with a strainer, the strainer as claimed in claim 1.

14. Fluid piping as claimed in claim 13, wherein the fluid piping is fluid circuit piping or a heating or cooling system.

15. A strainer as claimed in claim 1, wherein said first cap is releasably engageable with the body by one of: a co-operating screw thread arrangement, a snap-fit arrangement.

16. A strainer as claimed in claim 1, wherein said second cap is releasably engageable with the first cap by one of: a co-operating screw thread arrangement, a snap-fit arrangement.

* * * * *